United States Patent
Snodgrass et al.

(10) Patent No.: US 9,621,208 B1
(45) Date of Patent: Apr. 11, 2017

(54) MITIGATION OF MULTIPATH SIGNAL NULLING

(71) Applicant: Rockwell Collins, Inc., Cedar Rapids, IA (US)

(72) Inventors: Timothy E. Snodgrass, Palo, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/641,921

(22) Filed: Mar. 9, 2015

(51) Int. Cl.
    *H04B 15/00* (2006.01)
    *H04B 1/10* (2006.01)
    *H04B 7/022* (2017.01)
    *H04B 1/04* (2006.01)

(52) U.S. Cl.
    CPC ......... *H04B 1/1081* (2013.01); *H04B 1/0475* (2013.01); *H04B 7/022* (2013.01)

(58) Field of Classification Search
    CPC .................................................. G06K 19/0723
    USPC ........................................................ 455/506
    See application file for complete search history.

(56) References Cited

U.S. PATENT DOCUMENTS

| | | | | |
|---|---|---|---|---|
| 6,288,974 B1* | 9/2001 | Nelson | .................... | G01S 17/89 367/13 |
| 2004/0246100 A1* | 12/2004 | Kranz | .................. | G06K 7/0008 340/10.1 |
| 2007/0141997 A1* | 6/2007 | Wulff | .................. | G06K 19/0723 455/78 |
| 2008/0152030 A1* | 6/2008 | Abramov | ............. | H04B 7/0617 375/260 |
| 2010/0026576 A1* | 2/2010 | Belcea | .................. | G01S 5/0215 342/387 |
| 2011/0207489 A1* | 8/2011 | DeLuca | ............ | H04W 72/1205 455/509 |
| 2011/0264977 A1* | 10/2011 | Chen | ..................... | H04L 1/1819 714/749 |
| 2014/0362766 A1* | 12/2014 | Strait | ................ | H04L 25/03006 370/328 |

* cited by examiner

*Primary Examiner* — Wesley Kim
*Assistant Examiner* — Raj Chakraborty
(74) *Attorney, Agent, or Firm* — Angel N. Gerdzhikov; Donna P. Suchy; Daniel M. Barbieri (57) ABSTRACT

A communication system periodically changes the carrier wave frequency or phase such that a signal traveling a reflected path no longer destructively interferes with a signal traveling a direct line-of-sight path. The communication system negotiates a periodic frequency or phase shift with a receiver, and then shifts the frequency or phase according to the negotiated schedule to maintain continuous communication.

16 Claims, 8 Drawing Sheets

MITIGATION OF MULTIPATH SIGNAL NULLING

FIELD OF THE INVENTIVE CONCEPTS

The inventive concepts disclosed herein are directed generally toward communication systems and more particularly to mitigating multipath nulling.

BACKGROUND

During radio transmissions, signals routinely reflect off of surfaces. In certain situations, reflected signals travel a path that is longer than the direct, line-of-sight path by some multiple of the radio wavelength that causes destructive interference of the carrier wave at the receiver (multipath nulling). For moving transmitters, such as in aircraft, drones, missiles, and cars, as the distance to the receiver changes, the differential distance between the line-of-sight path and the reflected path dynamically changes such that the destructive interference periodically recurs resulting in periodic nulling of the carrier wave.

Reflection is particularly severe when flying low over calm water and communicating over long distances with a low grazing angle. Under such conditions the two signals will arrive completely out of phase and thereby cancel out each other at the receiver. Such conditions are particularly problematic for data links to sea skimming weapons.

For example: when conducting a low altitude attack on a ship at sea, nulling of communications repeatedly occurs as the plane approaches the target. Even at the speeds of modern jet fighters, the multipath problem causes a complete loss of communications for three to five seconds. For slower airborne vehicles, the loss of connectivity would be proportionally longer.

Frequency hopping has been employed to mitigate multipath nulling, but frequency hopping is not viable where there are a fixed number of available frequencies or the waveform does not lend itself to frequency hopping.

Consequently, it would be advantageous if an apparatus existed that is suitable for preventing periodic multipath carrier wave nulling.

SUMMARY

Accordingly, the inventive concepts disclosed herein are directed to a novel method and apparatus for preventing periodic multipath carrier wave nulling.

In some embodiments, a communication system periodically changes the carrier wave frequency such that a reflected wave no longer destructively interferes with the direct line-of-sight wave.

In some embodiments, a communication system periodically adjusts the phase of the carrier wave such that the reflected wave is no longer completely out of phase with the line-of-sight wave.

In some embodiments, a communication system negotiates a periodic frequency or phase shift with the receiver. The communication system then shifts the frequency or phase according to the negotiated schedule to maintain continuous communication.

It is to be understood that both the foregoing general description and the following detailed description are exemplary and explanatory only and are not restrictive of the claimed inventive concepts. The accompanying drawings, which are incorporated in and constitute a part of the specification, illustrate an embodiment of the inventive concepts and together with the general description, serve to explain the principles.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the subject matter disclosed, which is illustrated in the accompanying drawings. The scope of the invention inventive concepts disclosed herein is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
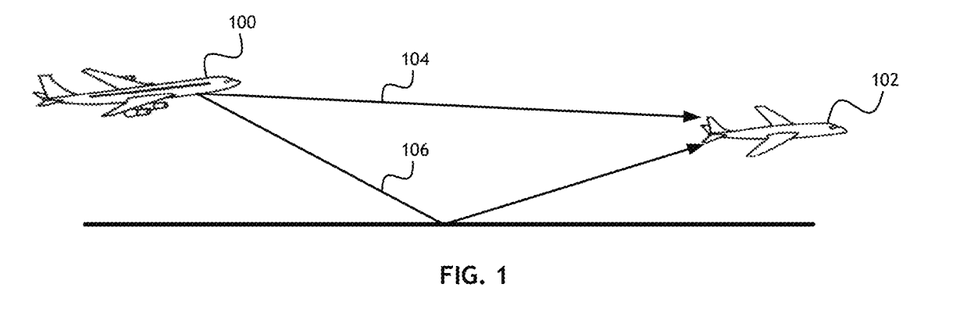
FIG. 1 shows a block diagram representation of multipath transmission.

Referring to FIG. 1, a block diagram representation of multipath transmission is shown. During transmission of a radio signal in proximity to a signal reflecting surface, the signal follows both a direct line-of-sight path 104 and a reflected path 106 from the transmitter 100 (in the present example, an aircraft) to the receiver 102. In some embodiments, the receiver 102 may be another aircraft; in other embodiments, the receiver 102 may be a ground based receiver 102. The actual differential between the line-of-sight path 104 and the reflected path 106 is a function of the distance between the transmitter 100 and the receiver 102, and the angle of reflection. As the distance between the transmitter 100 and the receiver 102 changes, and the differential between the line-of-sight path 104 and the reflected path 106 changes, the reflected signal will arrive at the receiver out of phase with the line-of-sight signal. The phase differential is also therefore a function of the distance between the transmitter 100 and the receiver 102 with the two signals being periodically completely out of phase. The completely out of phase signals null or cancel each other and communication between the transmitter 100 and receiver 102 is lost until the phase differential abates.

Multipath nulling is the result of geometric relationships that cause a specific carrier wave frequency to reflect off of a surface and arrive 180° out of phase. If either the geometry or the frequency were different, that null could not occur at that specific moment.

Figure 2:
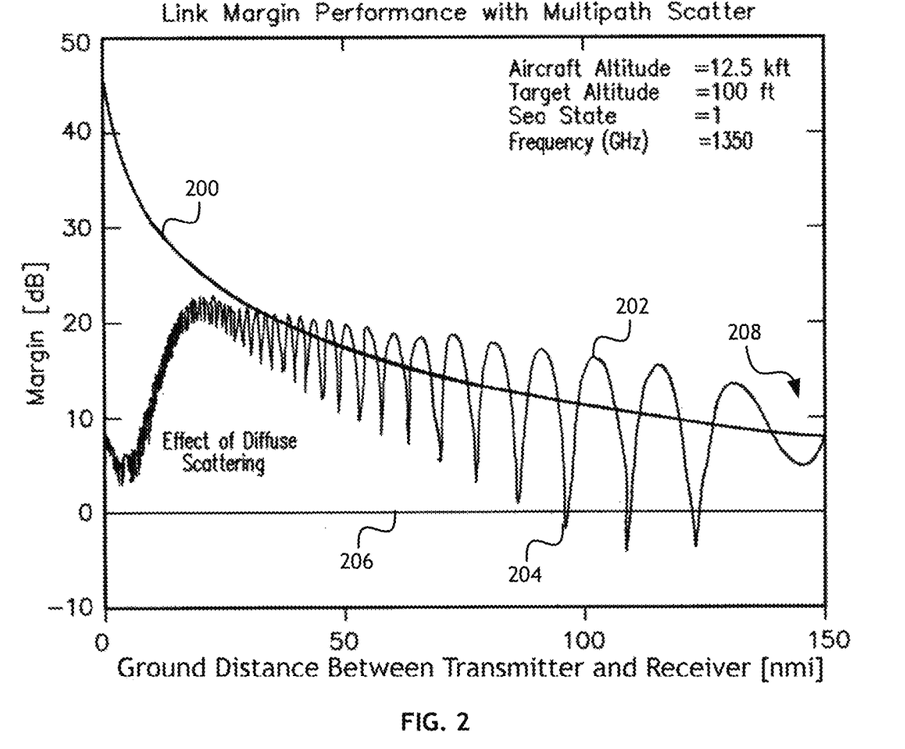
FIG. 2 shows a graphical representation of carrier wave signal strength during multipath nulling.

Referring to FIG. 2, a graphical representation of carrier wave signal strength during multipath nulling is shown. Communication between a transmitter and receiver in an environment where multipath nulling occurs may result in a signal having full strength periods 202 where communications are stable and above the median signal strength 200, and having nulling periods 204 where signal strength is at a trough due to destructive interference. Communications are disrupted for extended periods during such troughs 204 depending on the speed of the change in distance between the transmitter and receiver. Beyond a threshold distance 208 (in the present example, approximately 240 km or 130 nmi) the curvature of the earth tends to eliminate the possibility of multipath nulling because the reflected ray is obstructed.

In some embodiments, a minimum signal-to-noise (S/N) level 206 defines the required signal strength to maintain communications. In some cases, the nulling periods 204 drive the signal strength below the minimum S/N level 206. Some embodiments of the inventive concepts disclosed herein sufficiently mitigate the depth of nulling during the nulling periods 204 to produce a deterministic maximum null. Error correcting codes can recover any bits that are lost.

Figure 3:
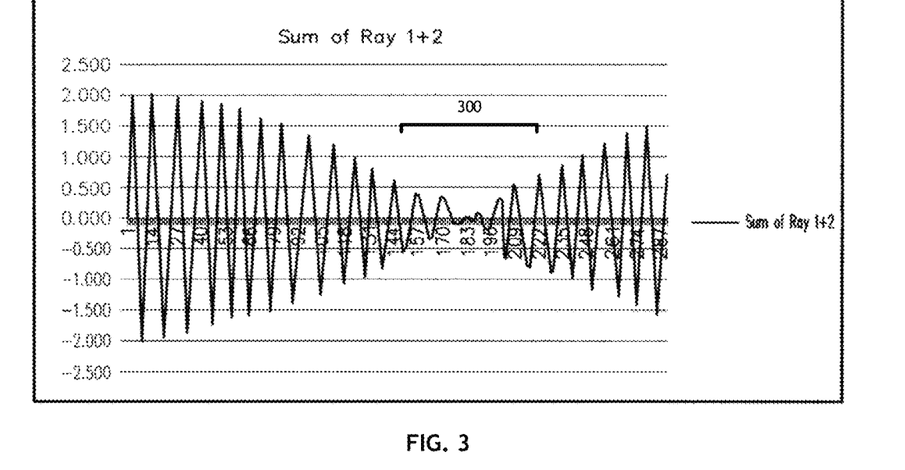
FIG. 3 shows a graphical representation of carrier wave signal strength during multipath nulling.

Referring to FIG. 3, a graphical representation of carrier wave signal strength during multipath nulling is shown. As the distance between a transmitter and receiver changes, the sum of a direct line-of-sight signal and a reflected signal also changes. As the phases of the line-of-sight signal and the reflected signal diverge, the total signal strength of the carrier wave signal falls. During a period of nulling 300, the carrier wave signal is too weak to maintain a datalink.

In conventional waveforms, the radio frequency (RF) carrier wave modulation is not changing, resulting in the classic "butterfly" amplitude pattern shown in FIG. 3.

Figure 4:
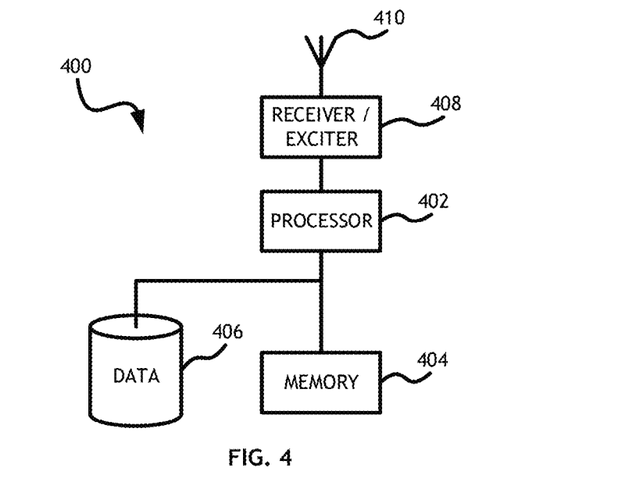
FIG. 4 shows a block diagram of a communication system useful for implementing some embodiments of the inventive concepts disclosed herein.

Referring to FIG. 4, a block diagram of a communication system 400 useful for implementing some embodiments of the inventive concepts disclosed herein is shown. The system 400 includes a processor 402, memory 404 connected to the processor 402 for storing computer executable program code, a data storage element 406 for storing parameters necessary for frequency or phase shifting as more fully described herein, a receiver/exciter 408 connected to the processor 402 and one or more antennas 410 connected to the receiver/exciter 408 for transmitting a signal to a receiver. A processor 402 according to embodiments of the inventive concepts disclosed herein may be a general purpose processor, configured through computer executable program code; or the processor 402 may be a hardware device specifically fabricated to perform the functions described herein.

In some embodiments, where the processor 402 determines that signal nulling is likely to occur at the receiver of a signal transmitted via the receiver/exciter 408 through the antenna 410, the processor 402 sweeps the carrier wave frequency up and down a bounded range of frequencies so that the line-of-sight signal will never continuously be in the same frequency as the delayed, reflected signal, and therefore the two signals will only ever cancel out for very shot durations that are compensable through interleaving and error correction coding. In some embodiments, the processor 402 employs a deterministic, predictable frequency sweeping algorithm such that a receiver can anticipate the frequency range and rate of change so that no data loss or very minimal data loss will result.

While some data may be continue to be lost due to destructive interference, as long as the median signal strength remains above a minimum S/N level, data recovery codes and techniques may be employed to recover any lost data bits.

In some embodiments, the processor 402 determines that signal nulling is likely based on known topography between the transmitter and receiver, radar data of the surrounding topography, data from the receiver indicating that nulling has occurred, or with reference to a stored archive of known locations where multipath nulling occurs. Alternatively, the processor 402 may receive reflected signals through the antenna 410 indicating an altitude and topography indicative of multipath nulling.

Figure 5:
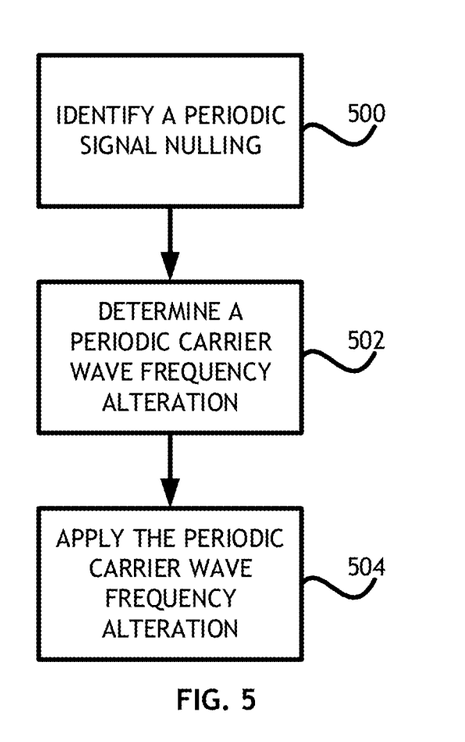
FIG. 5 shows a flowchart of one embodiment of the inventive concepts disclosed herein.

Referring to FIG. 5, a flowchart of one embodiment of the inventive concepts disclosed herein is shown. In this embodiment, periodic multipath signal nulling is identified 500. Multipath signal nulling may be identified 500 or anticipated based on mathematical models with reference to surrounding topography and other physical factors, with reference to a list or other data structure of known locations where multipath signal nulling has occurred, or with reference to a signal from a receiver that signal nulling is currently occurring.

Where multipath signal nulling is known or considered likely to occur, a periodic carrier wave frequency alteration is determined 502. In some embodiments, the frequency alteration is a continuous frequency sweep within a bounded range. A continuous sweep allows the receiver to determine a pattern of frequency change, or apply a known pattern where a predetermined frequency sweep is known. In other embodiments, the carrier frequency is shifted between two or more predetermined frequencies at a known interval; such interval may be defined by the period of signal nulling. The carrier wave frequency alteration is then applied 504 to a transmitted signal to reduce multipath signal nulling.

In some embodiments, the carrier wave frequency alteration is applied 504 in a similar fashion as a TRANSEC frequency hopping code. In these embodiments, TRANSEC is a pseudorandom indication of what frequency to transmit/receive on to provide anti-jam robustness against enemy jammers. TRANSEC at the receiver tracks the frequency used by the transmitter. The carrier wave frequency alteration is applied 504 in a similar process.

Figure 6:
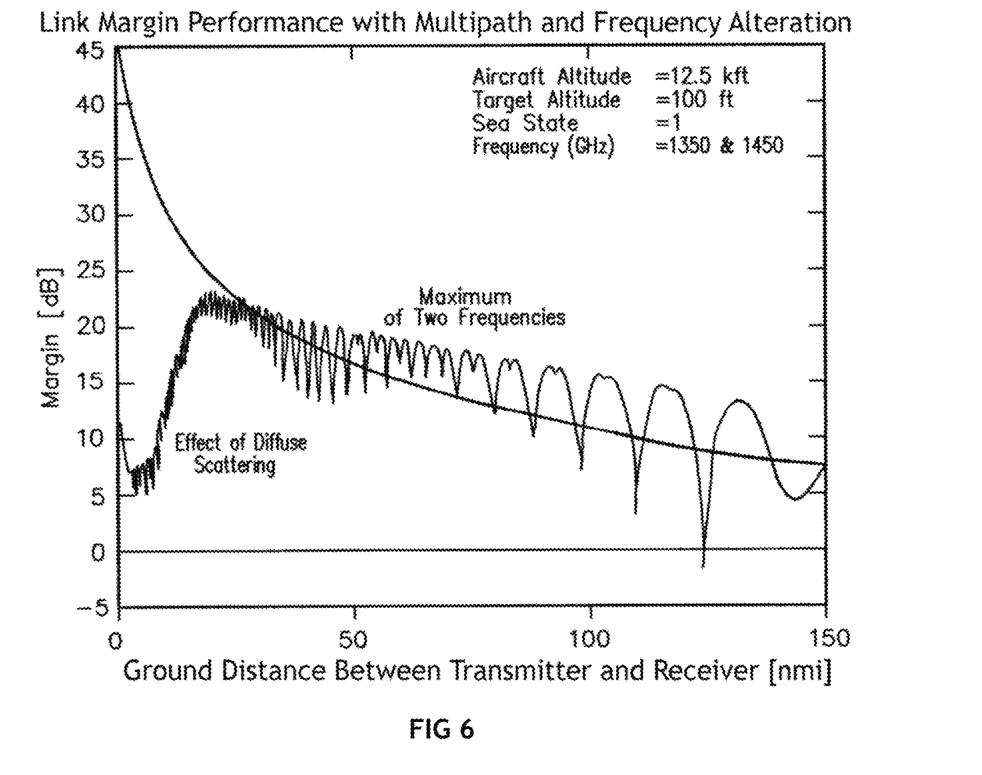
FIG. 6 shows a graphical representation of carrier wave signal strength during frequency shifting in a multipath nulling environment.

Referring to FIG. 6, a graphical representation of carrier wave signal strength during frequency shifting between two frequencies in a multipath nulling environment is shown. While limited destructive interference still occurs, at no point does multipath nulling reduce the carrier wave signal strength to a point where data is irrecoverably lost. As long as the median signal strength remains above a minimum S/N level, data recovery codes and techniques may be employed to recover any lost data bits.

Figure 7:
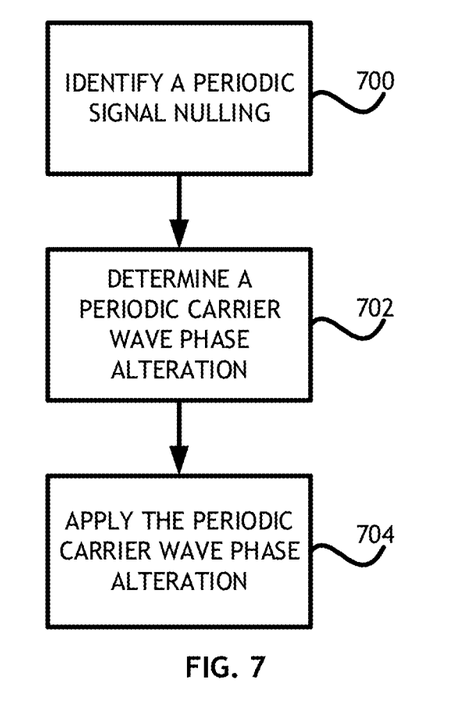
FIG. 7 shows a flowchart of another embodiment of the inventive concepts disclosed herein.

Referring to FIG. 7, a flowchart of another embodiment of the inventive concepts disclosed herein is shown. In this embodiment, periodic multipath signal nulling is identified 700. Multipath signal nulling may be identified 700 or anticipated based on mathematical models with reference to surrounding topography and other physical factors, with reference to a list or other data structure of known locations where multipath signal nulling has occurred, or with reference to a signal from a receiver that signal nulling is currently occurring.

Where multipath signal nulling is known or considered likely to occur, a periodic carrier wave phase alteration is determined 702. In some embodiments, the phase alteration is a complete 180° shift in phase. The phase shift may periodically recur whenever the known period of signal nulling recurs such that the line-of-site signal and the reflected signal are never completely out of phase. The carrier wave phase alteration is then applied 704 to a transmitted signal to reduce multipath signal nulling.

In some embodiments, the phase alteration comprises adding a binary phase-shift keying (BPSK) or other modulation on top of the existing modulation with the BPSK changing at a rate that is a function of the multipath delay, forward error correction (FEC) code and interleaver length. This prevents the null from becoming a steady-state condition.

In some embodiments, the phase alteration is applied 704 in a similar fashion as a TRANSEC cover code. In these embodiments, TRANSEC is a pseudorandom multiplication of the transmitted modulation by a binary string so as to hide the data's features from an observer. TRANSEC is stripped off by the receiver prior to the real data being recovered from the signal. Application 704 of the phase alteration is a similar process. Shifting the phase 180° at a periodic rate means a sustained multipath null cannot continuously occur, even when dwelling on one frequency at the maximally bad geometry. In a worst case scenario, only half of the data is lost; the other half would be received with twice the signal strength.

Embodiments of the inventive concepts described herein allow half data rate communications to occur where prior art systems would be unable to transfer any data, regardless of the FEC coding rate or the power level. Knowing what this physical layer is capable of, a waveform could be designed that never had multipath losses and supplied dependable communications at half the rate. The alternative approach would be to have a selectable mode where the "multipath mode" was only selected when operating with geometries that were known to result in multipath nulling.

Figure 8:
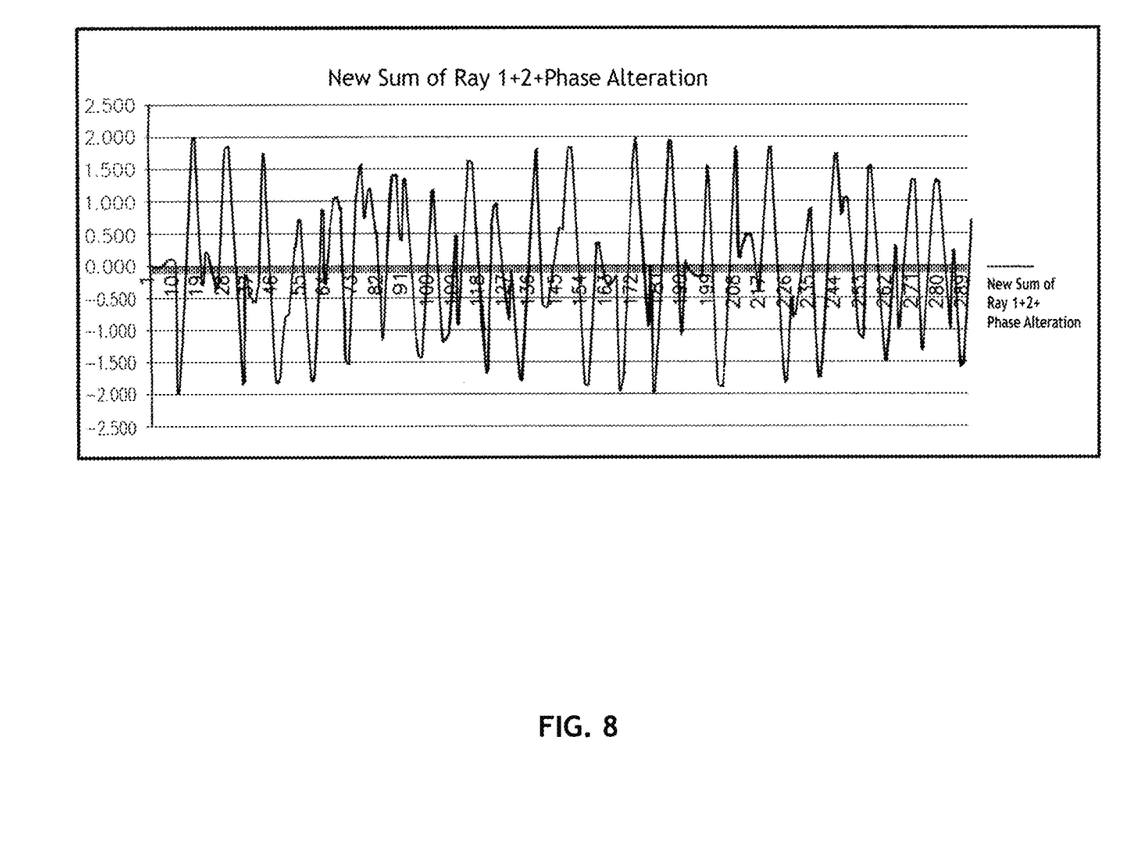
FIG. 8 shows a graphical representation of carrier wave signal strength during phase shifting in a multipath nulling environment.

Referring to FIG. 8, a graphical representation of carrier wave signal strength during phase shifting in a multipath nulling environment is shown. While destructive interference still occurs, such interferences is strictly limited in duration and any lost bits are recoverable through known means.

Figure 9:
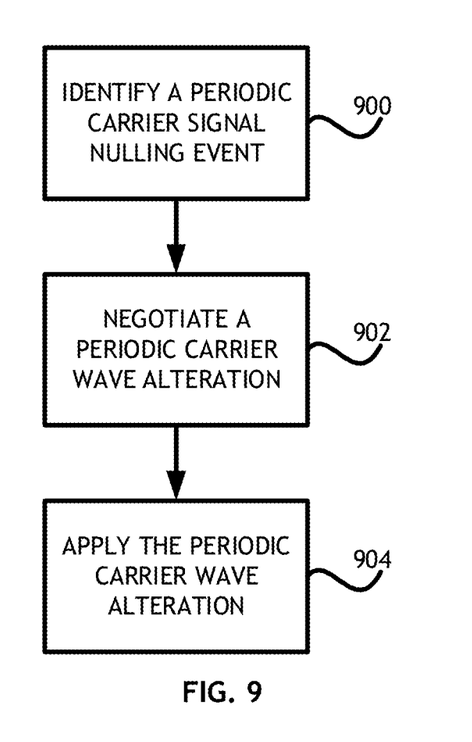
FIG. 9 shows a flowchart of another embodiment of the inventive concepts disclosed herein.

Referring to FIG. 9, a flowchart of another embodiment of the inventive concepts disclosed herein is shown. In this embodiment, periodic multipath signal nulling is identified 900. Multipath signal nulling may be identified 900 or anticipated based on mathematical models with reference to surrounding topography and other physical factors, with reference to a list or other data structure of known locations where multipath signal nulling has occurred, or with reference to a signal from a receiver that signal nulling is currently occurring.

Where two-way communication between the transmitter and receiver is possible, the transmitter and receiver may negotiate 902 a carrier wave alteration to minimize multipath nulling. Such carrier wave alteration may be a frequency alteration or phase shift as described herein. A negotiated carrier wave alteration allows the transmitter and receiver to maintain continuous data communication. The receiver may monitor carrier wave strength and negotiate 902 a new carrier wave alteration whenever carrier wave signal strength begins to drop due to multipath nulling. Each negotiated carrier wave alteration is applied 904 to the carrier wave.

This embodiment is useful when bidirectional communication is available, such as through full-duplex or time division multiple access (TDMA), and where there are multiple frequencies (channels) available to choose from. When the S/N ration and Bit Error Rate (BER) fall below a threshold, such as the historic signal median, the transmitter changes channels to a frequency that is different from the one being used, preferably by more than 10%-15%. Alternatively, the negotiated carrier wave alteration is a continuous frequency sweep within a bounded range of frequencies.

Figure 10:
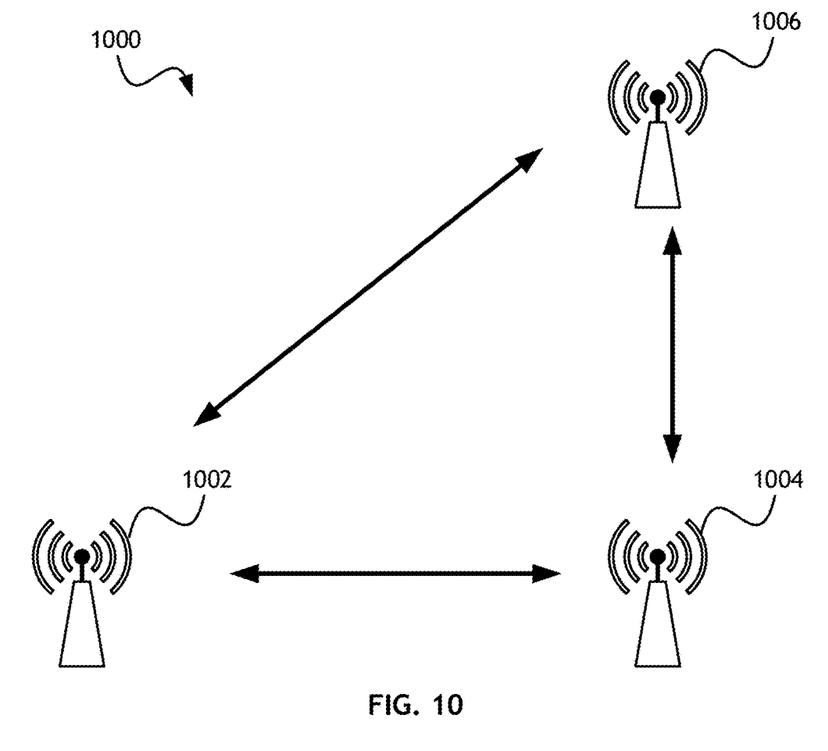
FIG. 10 shows a block diagram of a fixed wireless data communication network including embodiments of the inventive concepts disclosed herein.

Referring to FIG. 10, a block diagram of a wireless voice or data communication network 1000 including embodiments of the inventive concepts disclosed herein is shown. While previous exemplary embodiments have described multipath nulling in terms of a single, moving or stationary transmitter, some embodiments of the inventive concepts disclosed herein are directed toward, networks 1000 of multiple moving or stationary transmitters 1002, 1004, 1006. This technique, referred to herein as "virtual multipath" can either improve reliability compared to only a single node transmit, or else minimize interference when multiple nodes relay transmissions. For example, ITU-20090511-003A proposed text included use of virtual multipath to enhance broadcast and multicast services.

In single transmitter scenarios, the time period over which the transmitter must adapt is a function of propagation delay and symbol length. For the multiple transmitter scenario, the time period over which the transmitter must adapt is a function of symbol length independent of propagation delay.

In some embodiments, where multiple transmitters 1002, 1004, 1006 transmit identical signals at substantially the same time, virtual multipath nulling may cause destructive interference. For example, where a first transmitter 1002 in a network 1000 and a second transmitter 1004 in the network 1000 transmit the same signal, but are separated from a receiver 1006 by varying distances, the signals from the first transmitter 1002 and the second transmitter 1004 may produce an affect similar to multipath nulling. The frequency shifting and phase shifting methodologies described herein are useful to mitigate virtual multipath nulling as well.

In some embodiments, each transmitter 1002, 1004, 1006 comprises a node in a mobile ad-hoc network 1000 or a node in a cellular network 1000. In some embodiments, the network 1000 comprises a TDMA network 1000. A first transmitter 1002 node transmits in a first slot, and one or more second slot transmitters 1004 transmit in a second slot to relay the traffic.

It is believed that the inventive concepts disclosed herein and many of its attendant advantages will be understood by the foregoing description of embodiments of the inventive concepts disclosed herein, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A communication system comprising:
    a plurality of communication nodes, each of the plurality of communication nodes comprising:
        a processor;
        a receiver connected to the processor;
        a transmitter connected to the processor; and
        an antenna connected to the receiver and transmitter, wherein the processor is configured to:
    determine that periodic multipath nulling is likely during transmission through the antenna;
    determine a period of signal nulling;
    determine a carrier wave alteration, the carrier wave alteration comprising a substantially continuous frequency sweep within a bounded range and a shift between at least two alternate frequencies at a period defined by the period of signal nulling, configured to prevent a signal traveling a first path from completely nulling a signal traveling a second path; and
    apply the carrier wave alteration to a transmission.

2. The communication system of claim 1, wherein:
a first node in the plurality of nodes and a second node in the plurality of nodes are separated by a distance whereby substantially simultaneously broadcast signals from the first node and second node create virtual multipath nulling at a third node.

3. The communication system of claim 2, wherein the carrier wave alteration comprises a frequency alteration configured to mitigate destructive interference of a carrier wave at the third node.

4. The communication system of claim 2, wherein the carrier wave alteration comprises a phase shift configured to mitigate destructive interference of a carrier wave from a first node and a second node at a third node.

5. The communication system of claim 1, wherein the carrier wave alteration comprises a frequency alteration configured to mitigate destructive interference of a carrier wave at a third node.

6. The communication system of claim 1, wherein the carrier wave alteration comprises a phase shift configured to mitigate destructive interference of a carrier wave from a first node and a second node at a third node.

7. A communication apparatus comprising:
a processor;
memory connected to the processor;
an antenna connected to the processor; and
computer executable program code embodied in the memory, configured to instruct the processor to:
    determine that periodic multipath nulling is likely during transmission through the antenna;
    determine a period of signal nulling;
    determine a carrier wave alteration, the carrier wave alteration comprising a substantially continuous frequency sweep within a bounded range and a shift between at least two alternate frequencies at a period defined by the period of signal nulling, configured to prevent a signal traveling a reflected path from completely nulling a signal traveling a line-of-sight path; and
    apply the carrier wave alteration.

8. The communication apparatus of claim 7, wherein the carrier wave alteration comprises a frequency alteration configured to mitigate destructive interference of a carrier wave at a receiver.

9. The communication apparatus of claim 7, wherein the carrier wave alteration comprises a phase shift configured to mitigate destructive interference between the signal traveling the reflected path and the signal traveling a line-of-sight path.

10. The communication apparatus of claim 7, wherein:
the communication apparatus is configured for an aircraft; and
the communication apparatus is configured to communicate with a sea skimming missile.

11. The communication apparatus of claim 7, wherein the communication apparatus comprises a node in a mobile ad-hoc network.

12. The communication apparatus of claim 7, wherein the communication apparatus comprises a transmit node in a network comprising a plurality of nodes, each configured for transmitting the same data at substantially the same time to one or more other nodes in the network.

13. A method for mitigating multipath nulling comprising:
determining that periodic multipath nulling is likely during transmission;
determining a period of signal nulling;
determining a carrier wave alteration, the carrier wave alteration comprising a substantially continuous frequency sweep within a bounded range and a shift between at least two alternate frequencies at a period defined by the period of signal nulling, configured to prevent a signal traveling a reflected path from completely nulling a signal traveling a line-of-sight path; and
applying the carrier wave alteration.

14. The communication apparatus of claim 13, wherein the carrier wave alteration comprises a frequency alteration configured to mitigate destructive interference of a carrier wave at a receiver.

15. The method of claim 13, wherein the carrier wave alteration comprises a phase shift configured to mitigate destructive interference between the signal traveling the reflected path and the signal traveling a line-of-sight path.

16. The method of claim 13, wherein multipath nulling comprises virtual multipath nulling caused by an interaction of two or more transmitting nodes in a network, each configured for transmitting the same data at substantially the same time to one or more other nodes in the network.

\* \* \* \* \*